United States Patent
Pons Biescas et al.

(10) Patent No.: US 7,579,037 B2
(45) Date of Patent: Aug. 25, 2009

(54) ISOTONIC ENERGY DRINK AND PROCEDURE FOR OBTAINING IT

(75) Inventors: Antoni Pons Biescas, Valldemossa (ES); Josep Antoni Tur Mari, Mallorca (ES); Pedro Tauler Riera, Felanitx (ES); Antoni Aguilo Pons, Vista Alegre (ES); Nuria Cases Porcel, Palma de Mallorca (ES); Antonio Piña Florit, Soller (ES)

(73) Assignee: Fundacio Universitat Empresa de les Illes Balears, Palma de Mallorca (ES)

( * ) Notice: Subject to any disclaimer, the term of this patent is extended or adjusted under 35 U.S.C. 154(b) by 359 days.

(21) Appl. No.: 10/481,949

(22) PCT Filed: Jun. 26, 2002

(86) PCT No.: PCT/IB02/02503

§ 371 (c)(1),
(2), (4) Date: Dec. 23, 2003

(87) PCT Pub. No.: WO03/001929

PCT Pub. Date: Jan. 9, 2003

(65) Prior Publication Data

US 2004/0166222 A1 Aug. 26, 2004

(30) Foreign Application Priority Data

Jun. 29, 2001 (ES) .................................. 200101607

(51) Int. Cl.
*A23L 2/02* (2006.01)
(52) U.S. Cl. .......................... 426/632; 426/52; 426/72; 426/74; 426/506; 426/507; 426/518; 426/520; 426/521; 426/590; 426/810
(58) Field of Classification Search ................. 426/632, 426/52, 72, 74, 590, 506, 507, 518, 520, 426/521, 810, 620, 615, 640, 639, 658
See application file for complete search history.

(56) References Cited

U.S. PATENT DOCUMENTS

| | | | | | |
|---|---|---|---|---|---|
| 5,547,927 | A | * | 8/1996 | Cope et al. | 514/2 |
| 7,022,370 | B2 | * | 4/2006 | Loh | 426/634 |
| 2007/0212460 | A1 | * | 9/2007 | Inoue et al. | 426/268 |

FOREIGN PATENT DOCUMENTS

| | | | |
|---|---|---|---|
| ES | 2137134 | | 12/1999 |
| WO | 99/39591 | * | 8/1999 |

OTHER PUBLICATIONS

Gillette, F. L. 1929, The White House Cook Book, the Saalfield Publishing Co., Akron, Ohio, p. 336.*
Websters Ninth New Collegiate Dictionary, Merriam-Webster Inc., Springfield, MA, p. 157, 1047.*
Valsecchi, Pedro.*El Modemo Destilador-Licorista.*
Mita et al. "Molecular Cloning and Biochemical Characterization of a Lipoxygenase in Almond (Prunus Dulcis) Seed". Eur. J. Biochem. 268, pp. 1500-1507. FEBS 2001.
Fuller et al. "Activity of Soybean Lipoxygenase Isoforms Against Esterified Fatty . . . ". Archives of Biochemistry and Biophysics. Vol. 388, No. 1, Apr. 1, pp. 146-154, 2001.

* cited by examiner

*Primary Examiner*—Helen F Pratt
(74) *Attorney, Agent, or Firm*—Cozen O'Connor

(57) ABSTRACT

Enriched with antioxidant nutrients, mostly liposoluble, fibre and certain micro-elements and hydrosoluble vitamins, comprises almond milk. The procedure for obtaining said drink involves a first stage of blanching the almonds; a second crushing stage; a third stage in which fruit juices or teas are added; a fourth stage in which the mixture is sterilised or pasteurised; a fifth stage in which the loss of nutrients is corrected and a final stage in which the pH and osmolality are adjusted.

11 Claims, No Drawings

ISOTONIC ENERGY DRINK AND PROCEDURE FOR OBTAINING IT

FIELD OF INVENTION

The present invention refers to an isotonic energy drink with almond milk together with fruit juices or teas and other constituents such as micro-elements, vitamins, etc. and the procedure for obtaining it.

BACKGROUND TO THE INVENTION

Water is the basic substance of all the metabolic processes in the human body. It enables the transportation of metabolites (required for growth and energy-production) by means of the circulation and exchange of nutrients and end products of the metabolism between organs and the external medium. The water balance is regulated by hormones and the presence of electrolytes, especially sodium and chloride on the cell exterior, and magnesium and potassium on the cell interior.

Water alone is capable of freely crossing the cellular membranes. Osmosis is defined as the passing of water from an area with a low concentration of solute to an area with a higher level of concentration. The final objective of this exchange of water is to balance out both solute concentrations. In the human being, the transfer of body liquids takes place to normalize extra-cellular liquids at approximately 300 mOsm (isotonicity).

An Osmole is defined as the Avogadro number of particles. Thus, one mole of glucose is also one osmole. If one mole of NaCl is completely disassociated, 2 osmoles of particles are produced: 1 osmole of $Na^+$ and 1 osmole of $Cl^-$. One milliosmole (mOsm) is $10^{-3}$ osmoles. The most common concentration units are: osmolarity, osmoles of solute particles per liter of solution and osmolality, osmoles of solute particles per kilogram of pure solvent. Actually, most solutes are not completely disassociated, and osmolality should be defined as:

$$\text{Osmolality} = \text{osmole/kg } H_2O = \phi n\ C$$

where:
- $\phi$: The osmotic coefficient that determines the degree of disassociation
- n: The number of particles into which the molecule may disassociate
- C: The molal concentration of the solution One mOsm/kg is one mmole/kg in S.I. units.

Apart from the solute concentration, blood pressure also plays a significant role in the exchange of liquids. Together with the osmotic effects, blood pressure determines the proportion in which water leaves the circulation to enter the tissues, or enters the blood flow from the tissues.

The daily intake of food normally supplies quantities of sodium, chloride and potassium that are much higher than an adult's minimum needs. However, the plasmatic levels of electrolytes may be affected in cases of substantial losses, such as acute diarrhoea or intense and prolonged perspiration. In these cases, the inclusion of electrolytes is advisable in rehydration solutions.

Fat is an important energetic substrate, but its oral intake can cause problems, since it is one of the powerful inhibitors of gastric emptying and its absorption process is slow. However, the medium chain triglycerides, or MCT, do not appear to inhibit gastric emptying at the same level as fats. The intake of MCT leads to an increase in fatty acids in plasma, which could lead to an increase in the oxidation of fats and a reduction in the use of carbohydrates, with a saving in muscular glycogen. Recent research indicates that drinks containing both MCT and maltodextrins produce faster gastric emptying than drinks that contain only maltodextrins.

Supplementing a diet with minerals and vitamins in the cases of healthy individuals who follow a well-balanced diet containing sufficient amounts of meat, fruit, vegetables, cereals and wholemeal products will, in general, not be beneficial. However, due to various factors, the diet of athletes subject to intensive training is often unbalanced. The intake of minerals depends largely on the selection of food and the quantitative amount consumed, from what it gives rise to circumstances in which a supplement is desirable, such as in any situation in which athletes wish to abstain from a normal diet, or during periods when food intake is limited due to intensive training, especially in women, in those taking part in weight sports and in vegetarian athletes, where the consumption of diets with low micronutrient levels has been observed. It is also recommendable to add mineral substances to products and food that are prepared and designed to replace normal food during hyper-resistance competitions, such as the triathlon, resistance competitions which last several days, and high mountain climbing. However, the levels should not surpass those recommended as being safe for daily intake.

Healthy people (including athletes) often have a low intake of iron, zinc, copper and chrome. These low intake levels can lead to low levels of micro-elements, which can be exacerbated by the losses in perspiration and urine brought about by physical exercise, as well as by the low contributions and the increase in the losses caused by the high consumption of carbohydrates by athletes, especially during resistance competitions.

The effects of almonds on people's health are manifold. On the one hand, their high content in essential nutrients (minerals, vitamins, amino acids and fatty acids) covers part of the daily requirements for these nutrients. The high content of oleic acid, mostly a fatty acid which enables a favourable proportion of monounsaturated and saturated fatty acids, as well as a moderate and balanced content in polyunsaturated fatty acids and high levels of vitamin E means their consumption is beneficial to health. All these effects give almonds a high nutritional and biological value, together with the fact that they are a high quality source for dietetic lipids and fibre. The nutritional composition of the almond has been known for some time, and is the subject of many publications and databases. Normally, the different bibliographical sources coincide on the composition of the almond; however, there are variations regarding the effect on their nutritional value when they are roasted. Generally speaking, it is considered that the almond is a food with a high energy level, proteins, fats, minerals and vitamins. Its arginine content is outstanding, an amino acid that appears to play an important role in the processes associated with the dynamics of the cardiovascular system. Furthermore, it is a nut that is rich in calcium, iron, magnesium, phosphorus, zinc and copper, as well as in vitamins, in particular vitamins E, $B_2$, niacin and biotin. It also has a high percentage of essential fatty acids and fibre.

Almonds have a significant content of vitamin E, which is noteworthy due to its antioxidant character, thus avoiding the formation of free radicals which provoke mutation, distort the membrane phospholipids and damage their structure. Intense physical activity produces a situation of oxidative stress which can be compensated with an increase in the consumption of vitamin E, as we have shown in intervention studies supplementing the diet with a complex of vitamin E, vitamin C and beta-carotene. Almonds have a high content of monounsaturated fatty acids, mostly oleic acid. Oleic acid is considered beneficial when it substitutes saturated fats, due to its depressor effect on plasmatic cholesterol. The preparation of products based on the almond is widespread and includes almost all types of food, from sauces, sweets, soups, desserts, starters, aperitifs, etc. The oxidation of fats is one of the main processes of the deterioration of food, causing changes in aroma, flavour, taste, nutritional value, consistency and appearance. The oxidation reaction of unsaturated fatty acids is a chain reaction, influenced by free radicals, and one that may be started in many ways. Among them, the action of lipoxygenase, an enzyme found in raw almonds, which catalyses the formation of hyperoxides from polyunsaturated fatty acids and oxygen. The activity of this enzyme is the cause of the deterioration of fatty food such as the Majorcan sausage (Pons, Palou, Oliver, 1998, The Use of antibodies against lipoxygenase (EC 1.13.11.12) in food or ingredients, Patent 009800615/0) and its deactivation leads to a delay in the start of the oxidation process of fats. Neither the dynamics of this enzyme during the ripening of the almond nor its deactivation possibilities are known.

Almond milk is a product with a very ancient origin, a drink that is very traditional in the Balearic culture. The basic ingredients of the recipe are almonds, sugar and water, together with various aromatising agents. The following is a recipe from a book which dates from the beginning of the century, Valsecchi, P. "The Modern Distiller-Liquor Dealer", Barcelona 1928. The name of the product is "Almond syrup or almond milk, perfected by Henry y Guivourt". The composition, broken down into the ingredients used, is of 16 parts sweet almonds, 5 parts bitter almonds, 96 parts sugar, 1 part gum arabic, 8 parts double orange-flower water and 52 parts pure water.

The preparation is given as follows: "Take already peeled, dried almonds; crush them in a marble mortar with 20 parts sugar, then separate this paste into 6 or 8 parts so that, when they are crushed separately, the result is a very fine powder, which is then dissolved in 52 parts pure water; then it is sieved under high pressure. Add the rest of the sugar and the gum to the liquid, heat the mixture bain-marie, shaking it so that it dilutes well; sieve with a cloth and add the orange-flower water to the liquid obtained, stirring well to prevent the formation of an oily film. The addition of the gum is to stop the syrup from separating as it settles. This syrup will be sweeter and more nourishing depending on the gum used".

OBJECTS AND SUMMARY OF THE INVENTION

This invention also refers to a procedure for obtaining an isotonic energy drink as defined in claim 1.

This invention also refers to an isotonic energetic drink as defined in claim 11.

Inactivating the lipoxygenase by blanching the almonds, a process which may be used to peel them, also reduces the peroxidation of the fats. The blanching process may also be carried out in different ways, mainly by immersing the almonds in water at 100° C. for approximately 10 minutes so that the temperature of the water is lowered to around 60° C., when the almonds may be peeled, the brown skin discarded and the white cotyledon used for preparing the drink.

Optionally, almonds with the appropriate degree of ripeness are selected, depending on the present level of lipoxygenase activity, bearing in mind that the evolution of the enzyme may vary in accord with the ripeness, depending on the variety and growing method. In almonds grown on irrigated land, the ripening of the fruit produces a reduction in lipoxygenase activity, in such a way that when the fruit is still fresh and green, it contains high levels of this enzyme, whereas if it is dry and ripe, its levels are lower. In almonds grown on dry land, the varieties adapted to growing on dry land do not modify their levels of lipoxygenase as they ripen, on the contrary, the varieties adapted to growing on irrigated land increase the presence of lipoxigenase with the ripening.

Preferably, almonds with lipoxygenase activity equal to or below 600 μKat per gram of dry almond weight are selected.

Once the almonds have been blanched and peeled, they are crushed. Crushing can be carry out when they are dry and, preferably, in a vacuum, until a fine powder is obtained, which is appropriate for the manufacture of ice cream, or when they are damp, introducing the proportion of almond together with a syrup of sucrose or of another sugar in an instrument which is appropriate for crushing. It is also possible to first of all crush the almonds when they are dry to perfect, then, the crushing when they are damp in order to achieve a smaller size of particle. The means used for crushing the almonds when damp can be drinking water or a solution of a sugar or sweetener in water, or a specific mixture of both in accordance with the desired energetic and osmolal content. Both the dry and damp crushing must prevent increases in temperature in order to minimise the possible caramelisation reactions and other reactions that could those lead to nutritional loss of the product. In the case of dry crushing, the almond powder obtained is dissolved in water or in one of the aforementioned solutions or syrups.

Optionally, the solution obtained may be macerated for a certain time with a view to achieving good extraction of the material that is not very soluble, although this maceration can also be avoided if the content of soluble material from the almond is to be minimised in order to increase that coming from other ingredients. At the end of the maceration or immediately after the crushing, the liquid can be sieved in order to eliminate material that is insoluble or which has a particle size that is unpleasant for the consumer.

This invention also eliminates the need for sieving as long as the crusher achieves complete suspension of the almond.

The following stage consists of mixing the almond liquid obtained in previous stages with the corresponding amount of fruit juices selected depending on how rich they are in hydro-soluble antioxidant nutrients, mainly vitamin C. The amount of fruit juice added to the almond liquid depends on the osmolality of the mixture. As an example, adding a concentration of 4% orange juice to the almond liquid obtained as previously described, with an osmolality of 321 mOsmoles, results in a drink with a final osmolality of 240 mOsmoles. The addition of fruit juice can be made from recently squeezed or liquidised fruit, or from their commercial concentrates. Preferably, the fruit to be used is oranges, lemons, strawberries, grapes including seeds and skin, azeroles, kiwis and carrots. Teas, or their concentrates, and other medicinal plants such as large-leaved lime (*Tilia cordata* Mill) camomile, mint, menthol or cinnamon may also be used. In all cases, the proportions to be added will depend on the osmolality of the final mixture.

The procedure for making the drink is completed with a sterilisation or pasteurisation process, or any other process which is effective in terms of hygiene, salubriousness and conservation of the product.

This last stage may lead to a reduction in the nutritional value of the drink as a result of the thermal effect; this loss can be partially or completely corrected before final packaging by adding the corresponding nutrients in solid form or as sterile solutions.

In the same way, the osmolality and pH of the drink is adjusted by adding any hydroxide solution, preferably sodium hydroxide.

EXAMPLES

This invention is best shown with the following examples, which do not seek to be restrictive in scope, and defined exclusively by the attached claims. In this way, for example, the specific concentrations and the nature of the ingredients and additives described in the examples may be extended to others and to other concentrations. The varieties of almonds used and the systems used to cultivate the almonds may be extended to other varieties and systems which have been proved to be reducers of lipoxygenase content. The blanching system specified in the examples may be applied to other peeling and blanching systems which deactivate the lipoxygenase enzyme of the almond. The machinery and instruments used in the examples may vary and do not limit the invention. The nutritional value specified in the examples may vary depending on the use of other ingredients and/or the addition of other nutrients.

Example 1

This example illustrates a typical procedure which may be followed when preparing an isotonic drink of almonds with lemon juice. The process for making the drink consists of the following stages:
1. —Make a syrup with sugar, ¼ stick of cinnamon and mineral water. The syrup is obtained by dissolving 65 g of sucrose in 1 liter of heated commercial mineral water.
2. —Cool the syrup to room temperature.
3. —Crush 100 g of peeled almonds with a "Termomix" type crusher with a small volume of the sucrose syrup. The "Termomix" has different crushing levels on a scale from 1 to 12. First of all, crush the mixture for 10 seconds at level 2 and then for one minute and a half at level 12.
4. —Mix the crushed almonds with the remaining amount of syrup and crush again for 10 seconds at level 2.
5. —Cool to room temperature.
6. —Macerate cold for 24 hours (at approximately 4° C.).
7. —Add 15 ml of freshly squeezed lemon juice.
8. —Shake the mixture to even out the ingredients.
9. —Sieve the fluid with serge (a cloth with a wide 20 mesh).
10. —Pasteurise the almond milk: 20 minutes in a bath of boiling water.

This procedure obtains a drink with an osmolality value of 275 mOsm/kg. The osmolality is determined using The Advanced™ Micro-Osmometer Model 3MO. No special preparation of the sample is required; body fluids such as blood, serum or plasma may be used directly. We use the drink directly to determine the osmolality. 20 µl of the sample are piped with an automatic pipette and the tip is introduced into the freezing chamber. The content of the pipette must not be injected into the interior of the chamber; simply hold the tip of the pipette with the sample in the interior until the test has ended. Once the analysis start button has been pressed, the osmometer will automatically complete the determination by taking the sample to freezing point. The result of the analysis appears on screen in units of mOsm/kg.

Example 2

This example illustrates a typical procedure which may be followed to prepare an isotonic almond drink with orange juice. It also shows the fact that the mixture of ingredients produces an osmolality value lower than expected.

The procedure followed is the same as the one described in example 1 except that in this case, instead of using lemon juice, 75 ml of freshly squeezed orange juice is used.

Measuring the osmolality of the final drink, based on the procedure set forth in example 1, gives a value of 246 mOsm/kg. This value allows for the addition of NaCl up to a final concentration of 20 mmoles/kg. The osmolality value of the almond syrup obtained after maceration (point 6) according to the procedure set forth in example 1 is 301 mOsm/Kg, whereas the osmolality value of the final drink to which orange juice has been added is 246 mOsm/kg. The process of mixing the different ingredients has produced a change in the pH of the final product which may have altered the expected osmolality value.

Example 3

This example illustrates the change in pH which takes place when the different ingredients are mixed based on the procedure set forth in example 1. It also shows how a change in pH can affect the osmolality value of a solution.

Crushing almonds as described in point 1 of example 1 gives a pH value of 6.6; a freshly squeezed lemon has a pH value of approximately 2.10. The final drink obtained using the procedure set forth in example 1, with a mixture of 15 ml of lemon juice, 100 g almonds, 65 g sugar and 1 liter of water has a final pH value of 5.2.

Mixing a solution of approximately 0.15 N of sodium hydroxide with an osmolality value of 276 mOsm/kg with an equal volume of a solution of approximately 0.15 N of hydrochloric acid with a value of 287 mOsm/kg produces a solution of sodium chloride with a pH value of 11.7 and an osmolality value of 118 mOsm/kg. However, if instead of mixing these solutions together, we mix each one with an equal volume of distilled water, the osmolality values measured are as follows: for the case of a 1:1 solution with water of the initial solution of 0.15 N hydrochloric acid, the osmolality of the mixture is 109 mOsm/kg; for the corresponding case of sodium hydroxide, the value of the mixture is 111 mOsm/kg. Based on with this data, if we had made a 1:1 mixture with the hydrogen chloride solution and caustic soda, the expected concentration of ionic species would give an osmolality value equivalent to the sum of the previous two, in other words 220 mOsm/kg. However, given that a neutralisation reaction occurs, the real osmolality value obtained is 118 mOsm/Kg.

Example 4

This example illustrates how the selection of varieties and cultivation systems makes it possible for the drink to be enriched with vitamin E.

The concentration of vitamin E has been determined by a reverse phase HPLC system after a process of extracting the vitamin E from the almond.

The extraction of vitamin E from the almond has been made as set forth in the following procedure. Approximately 0.5 g of almonds is weighed on precision scales (perfectly peeled and finely chopped). They are homogenised with 10 ml of tri-sodium phosphate buffer 50 mM pH 7.0 in a Sorvall Omni-mixer homogeniser at level 3 speed for 5 minutes without heat. 2 ml of the homogenised substance are piped in duplicate on tubes of glass, together with an equal volume of ethanol and protected from contact with the light by wrapping them in aluminium foil. The tubes are upturned for 10-15 seconds and then 4 ml of n-hexane is added to one of the tubes and 50 µl of a solution of vitamin E which is very pure in hexane (approximate concentration of 0.6 µg/µl) and 4 ml of n-hexane is added to the other. This strategy makes it possible to calculate the vitamin E recuperation factor of the almond. The tubes are closed and left to be turned over for approximately 15 minutes in a mechanical shaker. The mixtures obtained show separation in two phases (organic and aqueous) and they are centrifuged for 10 minutes at 2000 g and 4° C. The organic phases are recovered in other test tubes that are perfectly protected from the light, the vitamin E extraction is repeated with the addition of a further 4 ml of hexane, and after they have been centrifuged, the new supernatants are recuperated in the same test tubes.

The separation and quantification of the α-tocopherol or vitamin E is carried out by means of a Shimadzu HPLC chromatographic system made up of the following modules: a Shimadzu LC-10AD pump, a Shimadzu SIL -10A$_{XL}$ auto-injector and a Shimadzu SPD-M10A diode-array detector. The chromatographic conditions are as follows: Column: Nova Pack C18 (reverse phase) 3.9×150 mm. Mobile phase: $CH_3CN:THF:H_2O$ (55:37:8). Flow: 1 ml/min. Elution time: 5 minutes. Detection: spectrophotometric at 290 nm. Injection volume: 45 µl.

The determinations of vitamin E have been performed on almonds of the *Masbovera* and *Glorieta* varieties cultivated on dry land, using six samples of each variety. The vitamin E values obtained are significantly different: *Masbovera* variety 17±1 mg/100 g of almond and *Glorieta* variety 24±1 mg/100 g of almond. The *Masbovera* variety cultivated on irrigated land has a slightly higher level of vitamin E content, with a value of 21±1 mg/100 g of almond.

Example 5

This example shows how the selection of variety and cultivation system may make it possible to reduce the activity of the pro-oxidant systems present in the almond.

The lipoxygenase activity may be measured by continuous spectrophotometric monitoring of the appearance of the conjugated dienes, which absorb 234 nm, using linoleic acid as a substrate of the reaction. The almond samples are peeled and chopped up and put into the container of the Sorvall Omnimixer homogeniser. The amount of sample to be homogenised is approximately 1 g of almond to which 10 ml of extraction buffer (tri-sodium phosphate buffer 50 mM, pH 7,0) is added. Homogenisation is carried out in a water-ice bath at speed level 3 for 5 minutes. The homogenised substance is centrifuged for 10 minutes at 4° C. and 1000 g. The supernatants are collected to determine LOX activity.

We put 3 ml of the buffer of the reaction (tri-sodium phosphate buffer 200 mM pH 6,5) into a quartz tray, and added 20 µl of the homogenised substance and the mixture was shaken. The tray was deposited in the spectrophotometer, an automatic zero was performed and 20 µl of the concentrated linoleic acid solution was added (20 mg linoleic acid and 20 mg Tween-20 in 1 ml of distilled water); it was then shaken vigorously. Measuring of the absorbance began at 234 nm in a Shimadzu spectrophotometer and, with the help of a computer program, the gradient of the reaction in the interval of maximum linearity was calculated, normally appearing before the end of the 40 second period after the start of the reaction.

The lipoxygenase activity was determined in different varieties cultivated on irrigated and dry land. The results obtained are given in the following table 1.

TABLE 1

Lipoxygenase activity in the almond

| Lipoxygenase ACTIVITY | CULTIVATION TYPE | FERRAGNÉS VARIETY | MASBOVERA VARIETY | GLORIETA VARIETY |
|---|---|---|---|---|
| µkat/g almond | Irrigated land | 473 ± 10$^a$ | 450 ± 15$^a$ | 479 ± 13$^a$ |
|  | Dry land | 478 ± 13$^a$ | 529 ± 23$^{ab*}$ | 552 ± 19$^{b*}$ |
| µkat/g dry weight | Irrigated land | 488 ± 11$^a$ | 467 ± 16$^a$ | 496 ± 14$^a$ |
|  | Dry land | 492 ± 14$^a$ | 544 ± 24$^{ab*}$ | 568 ± 20$^{b*}$ |
| µkat/almond | Irrigated land | 525 ± 12$^a$ | 575 ± 20$^b$ | 624 ± 17$^c$ |
|  | Dry land | 540 ± 15$^a$ | 512 ± 23$^{a*}$ | 522 ± 18$^{a*}$ |

*Means significant differences between the types of cultivation ($p < 0.05$, t-Student) Different letters mean significant differences between the varieties of almond ($p < 0.05$, ANOVA).

The lipoxygenase activity (expressed per gram of dry weight of almond) is influenced by irrigated land and variety, where the response regarding irrigated land depends on the variety. The LOX activity increased 15-16% in the *Glorieta* and *Masbovera* varieties when they were cultivated on dry land, whereas they were unaltered in the case of the *Ferragnes* variety.

The differences between varieties are evident when they are cultivated on dry land, and disappear when they are cultivated on irrigated land. The *Ferragnes* variety cultivated on dry land shows a LOX activity profile which makes it more appropriate for preventing the oxidation of the fats during the preparation of the drink than the other two varieties.

Example 6

This example illustrates how a blanching procedure enables the partial deactivation of the lipoxygenase activity of the almonds. It also illustrates how sterilisation produces the total deactivation of the enzyme.

The lipoxygenase activity was determined as described in example 5.

The blanching procedure consists of submerging the almonds (25 g) in water (100 ml) at 100° C. until the temperature of the mixture reaches 60° C., when the almonds are taken out. The blanching makes it possible for the almonds to be peeled. The lipoxygenase activity values were obtained from six samples of almonds blanched using this procedure. The reference values of lipoxygenase activity of the almond were obtained simultaneously in 6 samples of almonds peeled with knives and kept at room temperature at all times. The lipoxygenase activity of the reference samples was 221±7 µkat/g almond, whereas the activity of the blanched samples was 117±7 µkat/g almond, showing a significant loss of 50% of the activity.

The bain-marie sterilisation of an almond drink was carried out with a water volume of around 8 liters. 6 hermetically closed cans of 0.5 liters of almond drink were introduced and the water was boiled for 20 minutes. After this time, it was left to cool to at a temperature of approximately 60° C. The lipoxygenase activity of the content of the tins of almond drink was determined before and after this sterilisation process, with the following results: 176 µkat/g almond before sterilisation and not detectable after sterilisation.

Example 7

This example illustrates the nutritional value of two drinks made in a way that is similar to that described in example 1 without the sieving process indicated in point 9. The calculation of the nutritional value was made based on the average composition described for the ingredients in the food composition tables (Mataix, J & Mañas, M 'Spanish food composition tables' 3rd edition. Institute of Food Technology and Nutrition. University of Granada, 1998) and on the levels of vitamin E determined in the almonds used in accordance with the procedure set forth in example 4.

The quantities of the ingredients used were:
- Almond drink with orange juice: 100 g of almonds, 65 g common sugar, 50 ml freshly squeezed orange juice, 1 liter of mineral water, ¼ stick of cinnamon.
- Almond drink with lemon juice: 100 g almonds, 65 g common sugar, 15 ml freshly squeezed lemon juice, 1 liter mineral water, ¼ stick of cinnamon.

Besides the detailed composition of nutrients of these drinks, the following table shows the percentage of the recommended intake of nutrients covered by the consumption of 330 ml of these drinks.

In general, the consumption of liquids must be equivalent to the total daily change of water (approximately 4% total weight). This may be modified by physical exercise, metabolic rhythm, insignificant losses, climatic conditions, height, etc. Therefore, in general, it is recommended that a male weighing 70 kg should consume around 2 l/day, which should be increased when doing physical exercise by 1 ml/kcal energy use (a marathon 3000 kcal=3 liters; mountain stage of a cycling competition 6000 kcal=6 liters). The consumption of two packets of this prepared drink may represent between 27-28% of the recommended water intake for a person performing moderate physical activity, and in the case of athletes with abundant perspiration the percentage would be lower due to the fact that the needs are proportional to the energy used.

Table 2 shows that the consumption of two packets of this almond drink, equivalent to a volume of 660 ml, provides almost 100% of the recommended daily intake of vitamin E and also in a way that is chemically acceptable for assimilation by the organism. Furthermore, the almond contains an important percentage of folic acid, thiamine, riboflavin, zinc, magnesium, iron and calcium. Moreover, the content in fatty acids may increase the absorption of liposoluble vitamins.

TABLE 2

Nutritional composition of the drink and % of daily intake Energy and Nutrient Recommendations

| Quantities in 330 g of almond milk | Composition with lemon juice | % IDR[1] | Composition with orange juice | % IDR[1] |
|---|---|---|---|---|
| Edible portion | 330 | — | 330 | — |
| Energy (kcal) | 231 | 7.92/9.9 | 228 | 7.92/9.9 |
| Energy (kJ) | 964 | 7.92/9.9 | 952 | 7.92/9.9 |
| Proteins (g) | 5.63 | 10.4/13.7 | 5.52 | 10.2/13.5 |
| Fat (g) | 15.0 | — | 14.5 | — |
| Saturated fat (g) | 1.07 | — | 1.04 | — |
| Monounsaturated fat (g) | 9.24 | — | 8.95 | — |
| Polyunsaturated fat (g) | 2.53 | — | 2.45 | — |
| Cholesterol (mg) | 0 | — | 0 | — |
| Carbohydrates (g) | 19.5 | — | 19.9 | — |
| Fibre (g) | 4.02 | — | 3.90 | — |
| Calcium (mg) | 98.7 | 12.3/12.3 | 97.3 | 12.1/12.1 |
| Iron (mg) | 1.83 | 18.3/10.1 | 1.79 | 17.9/9.93 |
| Iodine (µg) | 0.776 | 0.561/0.693 | 0.815 | 0.594/0.726 |
| Magnesium (mg) | 76.1 | 21.7/23.0 | 74.7 | 21.4/22.6 |
| Zinc (mg) | 2.05 | 13.7/13.7 | 2.01 | 13.4/13.4 |
| Sodium (mg) | 6.55 | — | 6.44 | — |
| Potassium (mg) | 201 | — | 211 | — |
| Phosphorus (mg) | 144 | — | 141 | — |
| Thiamin (B1) (mg) | 0.129 | 10.7/14.3 | 0.132 | 11.0/14.7 |
| Riboflavin (B2) (mg) | 0.188 | 10.5/13.4 | 0.185 | 10.3/13.2 |
| Vitamin B6 (mg) | 0.030 | 1.65/1.85 | 0.033 | 1.83/2.06 |
| Cobalamin (B12) (µg) | 0 | 0 | 0 | 0 |
| Ascorbic acid (C) (mg) | 2.15 | 3.56/3.56 | 5.44 | 9.08/9.08 |
| Folic acid (µg) | 27.3 | 13.7/13.7 | 31.1 | 15.5/15.5 |
| Niacin (mg Eq niacin) | 1.49 | 7.46/9.93 | 1.49 | 7.46/9.93 |
| Vitamin A (µg Eq retinol) | 0.086 | 0.010/0.010 | 1.36 | 0.135/0.172 |
| Vitamin D (µg) | 0 | 0 | 0 | 0 |
| Vitamin E (mg) | 5.61 | 46.8/46.8 | 5.45 | 45.4/45.4 |

[1]Recommended intake of energy and nutrients for the Spanish population (revised 1998). The energy needs are calculated for moderate activity. The first values refer to males and the second to females between the ages of 20 and 39 years.

The invention claimed is:

1. A process for obtaining an isotonic energy drink enriched with antioxidant nutrients, hydrosoluble vitamins, almond milk, fiber and minerals selected from the group consisting of sodium, calcium, iron, magnesium, zinc, potassium, phosphorus, and iodine, comprising the following steps:
   a) deactivating the lipoxygenase present in almonds by immersing the almonds in water at 100° C. for approximately 10 minutes so that the temperature is lowered to around 60° C.;
   b) crushing the almonds of (a);
   c) adding juices or teas or concentrates of tea and other medicinal plants, so that for every 1 Liter of water of (a), 15-75 ml of juice, tea or concentrate of tea and other medicinal plants is added;
   d) sterilizing or pasteurizing the mixture of (c);
   e) correcting the total or partial loss of certain nutrients; and
   f) adding a hydroxide solution to adjust the osmolality and pH value, so that the osmolality value obtained is 118-301 mOsm/kg.

2. A process in accordance with claim 1, wherein said almonds are selected from among the varieties that present a lipoxygenase activity equal to or lower than 600 µKat per gram of dry almond weight.

3. A process in accordance with claim 1, wherein said crushing is carried out when the almonds are dry and/or damp.

4. A process in accordance with claim 1, wherein the temperature during crushing is below 15° C.

5. A process in accordance with claim 1, wherein said crushing is carried out in the absence of oxygen.

6. A process in accordance with claim 1, wherein, after crushing, the almonds are macerated.

7. A process in accordance with claim 6, wherein, after maceration, the mixture is sieved.

8. A process in accordance with claim 1, wherein correcting the total or partial loss of certain nutrients is carried out by adding a sterilised and hypotonic, hypertonic or isotonic solution of said nutrients.

9. A process in accordance with claim 1, wherein-adjusting pH and osmolality is carried out by adding a hydroxide.

10. A process in accordance with claim 1, wherein the almonds are selected from among the varieties that contain an amount that is equal to or higher than 17 mg of vitamin E per each 100 grams of dry almonds.

11. A process as in claim 1, wherein said antioxidant nutrients are liposoluble.

* * * * *